(12) United States Patent
Allen et al.

(10) Patent No.: US 6,395,242 B1
(45) Date of Patent: May 28, 2002

(54) PRODUCTION OF ZINC OXIDE FROM COMPLEX SULFIDE CONCENTRATES USING CHLORIDE PROCESSING

(75) Inventors: Carole Allen, Pierrefonds; Peter Kondos, Montréal; Serge Payant, Pointe-Claire; Gezinus Van Weert, Caledon East, all of (CA); Anthonie Van Sandwijk, Leiden (NL)

(73) Assignee: Noranda Inc. (CA)

( * ) Notice: Subject to any disclaimer, the term of this patent is extended or adjusted under 35 U.S.C. 154(b) by 0 days.

(21) Appl. No.: 09/410,102

(22) Filed: Oct. 1, 1999

(51) Int. Cl.[7] .................. C22B 19/00; C22B 23/00; C22B 15/00; C22B 17/00; C22B 61/00
(52) U.S. Cl. .................. 423/101; 423/104; 423/109; 423/140; 423/150.1; 75/724; 75/725; 75/726; 75/733; 75/738
(58) Field of Search .................. 423/622, 109, 423/140, 141, 142, 104, 101, 102, 481, 155, 639, 488, 38, 39, 150.1, 98; 75/726, 733, 738, 724, 725

(56) References Cited

U.S. PATENT DOCUMENTS

| | | | | |
|---|---|---|---|---|
| 3,973,949 A | * | 8/1976 | Goens et al. | 423/109 |
| 4,026,773 A | | 5/1977 | Van Peteghem | 204/108 |
| 4,206,023 A | | 6/1980 | Au | 204/118 |
| 4,337,128 A | | 6/1982 | Haakonsen et al. | 204/107 |
| 4,346,062 A | | 8/1982 | Au | 423/109 |
| 4,362,607 A | | 12/1982 | Ritcey et al. | 204/108 |
| 4,378,275 A | * | 3/1983 | Adamson et al. | 423/24 |
| 4,440,569 A | | 4/1984 | Weir et al. | 75/120 |
| 4,443,253 A | | 4/1984 | Weir et al. | 75/120 |
| 4,505,744 A | | 3/1985 | Weir et al. | 75/120 |
| 4,510,028 A | | 4/1985 | Bolton et al. | 204/119 |
| 4,536,214 A | * | 8/1985 | Ochs et al. | 423/109 |
| 4,545,963 A | | 10/1985 | Weir et al. | 423/26 |
| 4,637,832 A | | 1/1987 | Cammi et al. | 75/109 |
| 4,832,925 A | | 5/1989 | Weir et al. | 423/141 |
| 4,944,928 A | * | 7/1990 | Grill et al. | 423/155 |
| 5,017,346 A | | 5/1991 | Spink et al. | 423/101 |
| 5,091,161 A | * | 2/1992 | Harris et al. | 423/150.1 |
| 5,380,354 A | | 1/1995 | Chalkley et al. | 75/743 |
| 5,869,012 A | | 2/1999 | Jones | 423/24 |

FOREIGN PATENT DOCUMENTS

| | | |
|---|---|---|
| DE | 25 55 813 | 6/1976 |
| JP | 04147927 | 5/1992 |
| JP | 05098366 | 4/1993 |

OTHER PUBLICATIONS

Written Opinion (Sheets 1–4) for foreign counterpart application PCT/CA00/01102, no date.

* cited by examiner

Primary Examiner—Steven Bos
(74) Attorney, Agent, or Firm—Katten Muchin Zavis Rosenman

(57) ABSTRACT

The present invention relates to an apparatus and a process for producing zinc oxide from a zinc-bearing material. The process according to the present invention comprises the steps of leaching the complex sulfide material with hydrochloric acid and oxygen; precipitating iron from the leach solution using magnesium oxide and oxygen; removing copper, silver, cadmium, cobalt and lead from the leach solution by cementation with zinc dust; precipitating zinc oxide from the leach solution using magnesium oxide; and spray roasting the remaining magnesium chloride leach solution to regenerate hydrochloric acid and magnesium oxide. The present invention further relates to processes for recovering copper, silver, lead, and iron from complex sulfide materials.

37 Claims, 6 Drawing Sheets

PRODUCTION OF ZINC OXIDE FROM COMPLEX SULFIDE CONCENTRATES USING CHLORIDE PROCESSING

BACKGROUND OF THE INVENTION

1. Field of the Invention

The present invention is concerned with the extraction and recovery of zinc from zinc-bearing materials through a process carried out in a chloride-based media by chlorinating the metals followed by changing the media and performing electrowinning in a conventional sulfate electrolyte. This process also allows for the recovery of precious and other metals. The present invention further relates to a process for producing zinc oxide from a complex sulfide material, an apparatus for performing the process, and processes for recovering iron, copper, silver, and lead from a complex sulfide material. More particularly, the invention relates to a process of producing zinc oxide from such a complex sulfide material by, preferably, leaching the sulfide material with hydrochloric acid and oxygen, followed by precipitation of iron from the leach solution using magnesium oxide, and cementation of lead, copper, silver, cadmium and cobalt using zinc dust. Zinc oxide may then be precipitated from the leach solution using magnesium oxide. The residual magnesium chloride solution can then be spray roasted to regenerate hydrochloric acid and magnesium oxide.

2. Description of the Related Art

Use of chloride hydrometallurgy for the recovery of zinc from either complex sulfide ores or other metal-containing secondary materials offers many advantages over sulfate hydrometallurgical and pyrometallurgical processes. Concerns regarding the oversupplied market for sulfuric acid in North America and the shortage of conventional zinc concentrates have increased in recent years. De-coupling of zinc production from acid production and the processing of alternative feed materials offer a possible solution to these concerns. Gaining the ability to use a variety of zinc-bearing materials, such as difficult to process zinc concentrates or zinc containing wastes, has been the focus of numerous prior investigations. The recovery of precious metals from zinc concentrates and wastes, currently unachievable in most conventional electrolytic refineries, is another previously unrealized goal. The process of the present invention has been developed with these goals in mind.

This process aims to recover Zn, Ag, Cd, Cu and Pb from mineralogically complex sulfide concentrates and other zinc-bearing materials. Complex sulfide ores generally have a very high degree of mineral interlocking, and the minerals within them generally have small mineral grain size, making the production of saleable zinc and lead concentrates economically difficult or impossible using conventional mineral processing methods. Many deposits of these ores are known and could be exploited if adequate processing technology were available.

The HCl/$O_2$ leach process of the present invention results in the extraction of valuable metals (e.g., Zn, Ag and Pb) from a low grade complex concentrate as produced from an ore body of complex sulphides. Metal concentrations of the typical concentrate used are: 17.0% Zn, 2.14% Pb, 0.21% Cu, 123 g/t Ag and 32.8% Fe, but the process is not limited to this composition. The process allows for the on-site treatment of low grade material, resulting in the production of an iron-free zinc oxide that can be shipped to an electrolytic zinc refinery, therefore cutting down on transportation and residue disposal costs. Alternatively, the zinc oxide produced could be sold directly to customers.

The chloride process of the present invention could be used on zinc ferrites (from zinc process residues), on EAF (Electric Arc Furnace) and BOF (Basic Oxygen Furnace) dusts, or any other zinc-bearing materials of this nature.

The ferric chloride leach developed by Canmet (Craigen, W. J. S., Kelly, F. J., Bell, D. H. and Wells, J. A., Canada Centre for Mineral and Energy Technology, Ottawa, ON, Canada, 26pp. 3 refs., (in English), June 1990) uses chlorine and ferric chloride to recover zinc from complex metal sulfides. A solution containing both zinc chloride and ferrous chloride is sent through a solvent extraction unit to remove iron and leave a clean zinc chloride solution, which is then sent to electrolysis to extract zinc and recover chlorine. However, this process is disadvantageous in that the cost of electrowinning zinc in chloride media is high.

U.S. Pat. Nos. 4,378,275 and 4,536,214 provide a process for recovering zinc from complex sulfides. Complex sulfide ores are leached in autoclaves in one or two stages, and cupric chloride is the agent responsible for leaching zinc sulfide. The leach solution is purified by zinc dust cementation, and iron is removed by precipitation with MgO. Zinc is recovered by solvent extraction (loading on DEHPA (di(ethylhexyl)phosphoric acid) and stripping by zinc sulfate electrolyte), followed by electrolysis. Recovery of reagents is accomplished by sending the resulting $MgCl_2$ leach solution to a spray roaster where HCl and MgO are re-formed. This process involves multiple steps to produce a clean, organic-free electrolyte from a conventional zinc sulfate cellhouse. Furthermore, autoclaves are expensive pieces of equipment, unproven for use with chloride media involving oxidative solubilization.

U.S. Pat. No. 3,973,949 uses ferric chloride to leach zinc-containing materials. Zinc is purified by solvent extraction and then precipitated from the leach solution using sodium carbonate or sodium hydroxide. Reagents are recovered by electrolysis of sodium chloride solution in a chloro-alkali cell. Ferric chloride is regenerated using chlorine and oxygen. Two stages of solvent extraction are required. Thus, while environmentally acceptable and metallurgically elegant, this process is much more capital and operating cost intensive than the process of the present invention where $MgCl_2$ is decomposed to regenerate MgO and HCl.

Additional processes have been used to extract metals from sulfide ores. In U.S. Pat. No. 4,026,773, a process for extracting metals, including zinc, from manganiferous ocean floor nodule ore is disclosed. The process comprises treating the ore with hydrochloric acid to produce a solution of the metal chlorides further process to manganese dioxide and selectively extract Fe, Cu, Ni, Co and Zn.

Similarly, in U.S. Pat. Nos. 4,206,023 and 4,346,062, zinc is recovered from materials containing zinc sulfide by partially chlorinating the zinc sulfide containing material in an aqueous medium.

U.S. Pat. No. 4,337,128 teaches a method of leaching sulfide-containing raw materials having metal sulfides of copper, iron, lead, silver, mercury and zinc. These raw materials are leached using a solution comprising cupric chloride and ferric chloride.

Copper and zinc are separated and recovered from aqueous chloride solutions containing lead, copper, zinc, and impurities in U.S. Pat. No. 4,362,607.

In U.S. Pat. Nos. 4,440,569, 4,443,253, 4,505,744, 4,510,028, 4,545,963, 4,832,925, and 5,380,354, zinc is recovered from zinc containing sulfidic materials that also contain iron and lead or silver by leaching the sulfidic material under oxidizing conditions.

U.S. Pat. No. 5,017,346 discloses a method of refining zinc oxide from roasted concentrates containing zinc sulfide by leaching the concentrates in an aqueous sulfur dioxide solution under controlled conditions, so as to provide selective separation of the zinc from the other elements contained in the concentrates.

Zinc may also be extracted from a sulfide ore or concentrate containing copper and zinc by subjecting the concentrate to pressure oxidation in the presence of oxygen and an acidic halide solution to obtain a pressure oxidation slurry, as shown in U.S. Pat. No. 5,869,012. This slurry is then subjected to a liquid/solid separation step to produce a liquor containing copper and zinc in solution.

Methods of purifying aqueous zinc solutions by using zinc dust to cement out impurities are also known. U.S. Pat. No. 4,637,832 discloses a method of cementing out impurities such as copper, cadmium, nickel, and cobalt from an aqueous solution of zinc sulfate by using zinc dust and an activator such as Cu—As or Cu—Sb.

It is desirable to develop a process for producing zinc oxide from complex concentrates of sulfide materials that is easy to perform and cost-effective. None of the above-mentioned techniques addresses a process of producing a clean zinc oxide that overcomes the problems noted above.

SUMMARY OF THE INVENTION

It is an object of the invention to provide an apparatus for producing zinc oxide from a complex sulfide material. The apparatus comprises a leaching unit for leaching the complex sulfide material with hydrochloric acid and oxygen, a first precipitating unit for precipitating iron from the leach solution using magnesium oxide, and removing, lead copper, silver, cadmium and cobalt from the leach solution by cementation with zinc dust. A second precipitating unit is used to precipitate zinc oxide from the leach solution using magnesium oxide. Then the residual magnesium chloride solution may be spray roasted to regenerate hydrochloric acid and magnesium oxide.

A further object of the present invention is to provide a process for producing zinc oxide from a complex sulfide material. The process comprises the steps of leaching the complex sulfide material with hydrochloric acid and oxygen, precipitating iron from the leach solution using magnesium oxide, cementing lead, copper, silver, cadmium and cobalt in the leach solution with zinc dust, and precipitating zinc oxide from the leach solution using magnesium oxide. The residual magnesium chloride solution may then be spray roasted to regenerate hydrochloric acid and magnesium oxide.

Still another object of the present invention is to provide a process for recovering copper, silver, and lead from a complex sulfide material. The process comprises the steps of leaching the complex sulfide material with hydrochloric acid and oxygen, precipitating iron from the leach solution using magnesium oxide, and recovering lead, copper, silver, cadmium and cobalt from the leach solution by cementing with zinc dust.

A further object of the present invention is to provide a zinc oxide precipitate that is substantially free of contaminants by leaching a complex sulfide material with hydrochloric acid and oxygen. Iron is precipitated from the leach solution using magnesium oxide, and copper, silver and lead are cemented from the leach solution using zinc dust. Zinc oxide is precipitated from the leach solution using magnesium oxide.

The invention is described in more detail below with reference to the accompanying figures.

DESCRIPTION OF THE PREFERRED EMBODIMENTS

Figure 1:
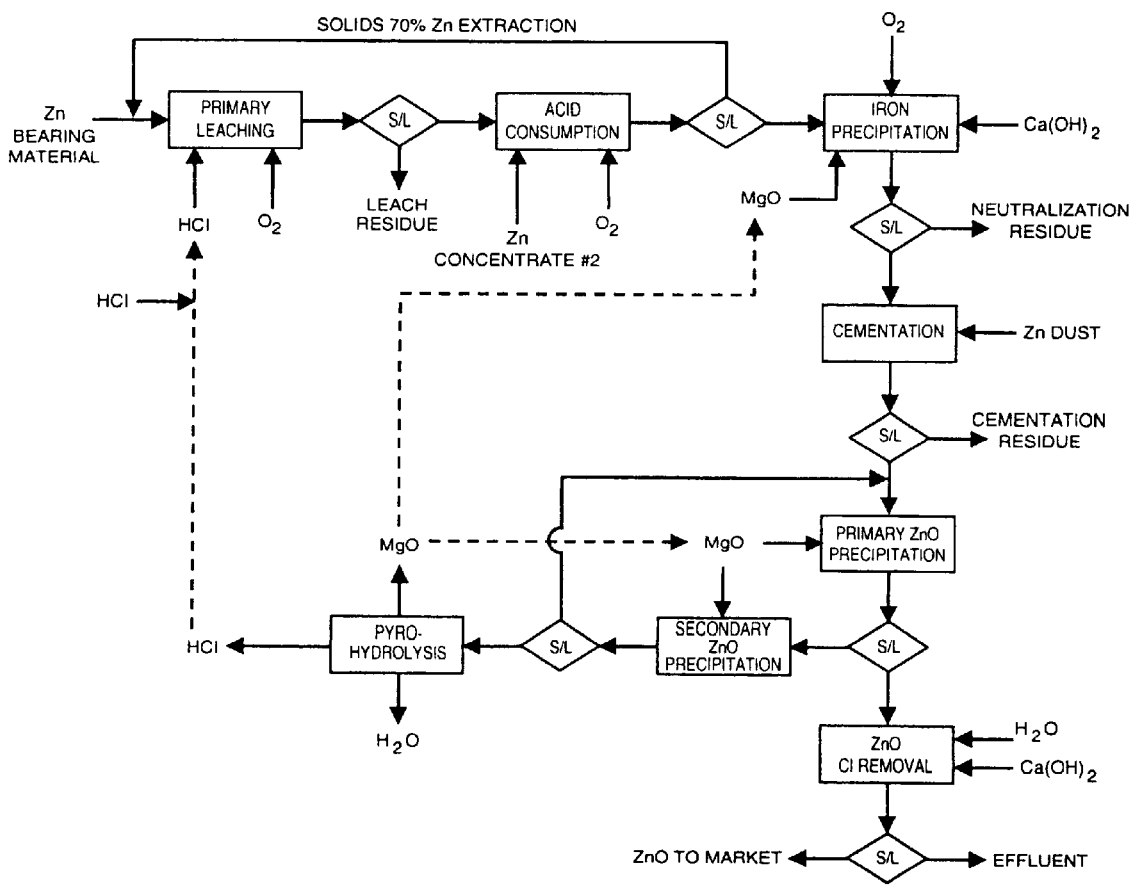
FIG. 1 is a flowchart illustrating the preferred process for producing zinc oxide from a complex sulfide material using chloride processing.

The presently preferred process of the present invention is comprised of a series of steps, as will be described in detail below.

Leaching and Acid Neutralization

The first step involves leaching a mineralogically complex sulfide concentrate using hydrochloric acid and oxygen. In order to achieve a highly selective leach of zinc over iron a concentrated hydrochloric acid is used and the potential of the slurry is controlled. The sulfide concentrate used in the reaction is typically of a low grade, and the metal concentrations present in the concentrate are approximately 17% by weight zinc, 2.14% lead, 0.21% copper, 123 g/ton silver, and 32.8% iron. The feed material tested is a reprocessed zinc ore tailing that forms a low grade zinc concentrate of complex metal sulfides such as sphalerite, chalcopyrite, pyrrhotite, arsenopyrite and galena. Operating conditions of the HCl/$O_2$ leaching system have established a highly efficient and selective, redox-potential controlled process with Zn extraction at 90–94%, with iron extraction limited to 0.15 t Fe/t Zn and sulfide sulfur transformed mostly into elemental sulfur. The chemical system applied in leaching involves the use of hydrochloric acid and oxygen gas. The principal reactions occurring during leaching are believed to be as follows (solid phases are shown in bold):

$ZnS + 2\ FeCl_3 \rightarrow ZnCl_2 + 2\ FeCl_2 + S^0$ (leaching)

$2\ FeCl_2 + \tfrac{1}{2}O_2 + 2\ HCl \rightarrow 2\ FeCl_3 + H_2O$ (oxidant regeneration)

$ZnS + \tfrac{1}{2}O_2 + 2\ HCl \rightarrow ZnCl_2 + S^0 + H_2O$ (overall)

Similar reactions take place for the other sulfide minerals such as pyrrhotite, galena, chalcopyrite, arsenopyrite and tetrahedrite present in the concentrate. Ferric ion ($Fe^{3+}$) is believed to be the oxidant, while cupric ions ($Cu^{2+}$) act as catalysts for the ferrous to ferric oxidation process. The iron required for the leach is provided by soluble iron species present in the concentrate (e.g., pyrrhotite). Copper addition is required for the bench-scale batch tests, but it should be needed for continuous plant operation, only if copper could not be consistently supplied through dissolution of minor amounts of chalcopyrite present in the feed.

Leaching of the complex metal concentrate with HCl and $O_2$ is performed under the following conditions: a) leach duration of 7 hrs at 95° C., b) initial HCl concentration of 6

N, c) stoichiometric amount of HCl added reaches 130%, based on Zn, Pb and Cu present in the concentrate, d) addition of Cu in the initial leaching solution $\geq 1.0$ g/l, e) $O_2$ flow rate of 200 ml/min (i.e., 0.06 t $O_2$/t conc.) to maintain a 400 mV ORP (oxidation-reduction potential), f) initial pulp density 400 g/l. When slurry ORP drops to 200 mV, then copper precipitates, resulting into a reduction in the rate of ferrous to ferric ion oxidation and diminished sphalerite (ZnS) dissolution. The elevated initial HCl concentration (i.e., 6 N) used in these batch tests will be significantly lower and constant in a continuous operation.

This leaching process described above may be performed as a single step leach with one addition of HCl to the solution, or as a continuous leaching process performed with multiple additions of HCl.

Although the leach may be performed at the conditions described above, the present invention is not to be limited to these conditions. The leaching step may be carried out at a temperature from about 50 to about 150° C., more preferably from 85 to 100° C., with 95° C. being the optimum temperature for the leach solution. The redox potential of the leach solution is controlled by oxygen and/or concentrate addition, and the effective redox potential of the solution may range from 250 to 600 mV, more preferably 350 to 400 mV. The pH of the leach solution is preferably very low, and ideally it is less than 1. The retention time for the leaching step may range from 4 to 12 hours, although 7 hours is the preferred retention time. The concentrations of zinc and iron present in the leach solution are preferably about 50 to 130 g/l and 20 to 25 g/l, respectively. A key advantage of this step of the process according to the present invention is the selectivity for zinc over iron.

Zinc extraction easily reaches 94% and lead consistently approaches 95% extraction, while copper and silver exceed 85%. Simultaneously, iron extraction is limited to 0.15 t Fe/t Zn and sulfide sulphur is gradually transformed into elemental sulfur resulting in a very low sulfate content of 0.05 t $SO_4^{2-}$/t Zn.

The use of air instead of $O_2$ results in a low overall Zn extraction (i.e., 70%), and also considerably reduces the Zn extraction rate. Use of $O_2$ doubles the quantity of concentrate leached. It is within the scope of this invention to use other oxidizing agents in place of oxygen. Furthermore, increased oxygen flow rates accelerate Zn dissolution and improve overall extraction, however the rate of oxygen consumption can become prohibitively high because most passes through and is vented.

The excess HCl not utilized during the leaching step is consumed by adding more sulfide concentrate while sparging oxygen, or another oxidizing agent. The concentrate addition is stopped when the pH reaches approximately 1.0, so as to neutralize the acidity while avoiding the consumption of too much neutralizing agent later on in the process. While filtration and thorough washing are required for solid/liquid separation following primary leaching (FIG. 1), the use of a thickener after acid consumption is sufficient.

This acid neutralization step is carried out under reaction conditions similar to those set o forth above with respect to the primary leaching process, although the preferred pH range is 0.5 to 1. The preferred concentrations of iron and zinc in the leach solution are 22 to 27 g/l and 80 to 150 g/l, respectively. Any solids remaining after the acid neutralization step are recycled to the primary leach.

Lead Crystallization

Large grains of liberated $PbCl_2$ have been observed in leach residues, due to the secondary precipitation of dissolved Pb, which in weak chloride media forms $PbCl_2$ precipitates. The solubility of $PbCl_2$ is significantly reduced by decreasing the temperature during filtration of the leach residue from the initial 95° C. leach solution temperature. This precipitation can be reversed to recover lead by repulping the leach residue at 95° C. with water and a chloride salt, followed by filtration and precipitation of $PbSO_4$ by the addition of $H_2SO_4$ The $PbCl_2$ may optionally be crystallized and shipped to a lead refinery for recovery.

Iron Neutralization

In this step, iron and other impurities are precipitated from the leach solution filtrate obtained in the leaching step using magnesium oxide as a well-slaked slurry of approximately 30% by weight. The magnesium oxide acts as a neutralizing agent, and causes iron to precipitate from the solution as akageneite (i.e. β-FeO(OH)), leaving less than approximately 0.4 mg Fe/l in solution.

The solution from the primary leaching and acid neutralization steps is treated with lime to remove $SO_4$. Oxygen is then sparged through the leach solution filtrate during iron removal to oxidize and precipitate iron. This method is similar to the geothite process used in the zinc industry. The primary leach filtrate, which has a pH of 1.0, is purified by adding a small amount of $Ca(OH)_2$ for sulfate control through gypsum precipitation. The remaining iron is then removed by adding MgO, as either a slurry of 3% or greater solids or as 100% solids, although other compounds such as ZnO, EAF dust, NaOH, $Na_2CO_3$, $Ca(OH)_2$, and $CaCO_3$ may also be used as precipitating agents. The purity of the reagent used is not very important, therefore a low quality product may be used. Lower-purity reagent may also be added as a make-up for lost reagents before pyrohydrolysis. A set of iron precipitation reactions is written below:

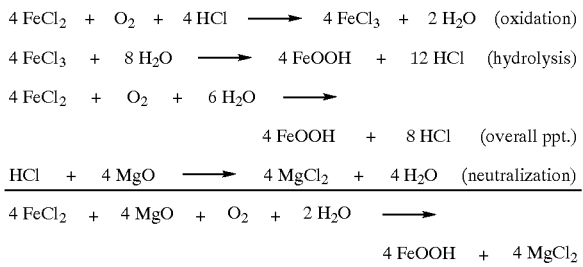

Soluble copper is also important in carrying out the reaction because of its catalytic effect on ferrous ion oxidation in acidic solutions. If the feed material doesn't have a high enough copper content, copper may have to be added. Maintaining the slurry ORP over 200 mV is essential to keep copper in solution.

During the precipitation of iron, other elements such as arsenic, aluminum, chromium, germanium and antimony are completely removed. Some copper and lead are also precipitated during this part of the process but not to completion (generally 1.5 g/l Pb remains in solution after iron precipitation). Lead precipitates as PbO or $PbO_2$ according to the chemical reactions:

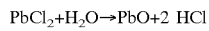
$$PbCl_2+H_2O \rightarrow PbO+2\ HCl$$

$$PbCl_2+H_2O+\tfrac{1}{2}\ O_2 \rightarrow PbO_2+2\ HCl$$

After filtration, the $ZnCl_2$ solution contains Cu, Bi, Ni, Co, Cd, Pb, Tl and Ag, which can be removed by cementation with Zn dust. Only the inert elements such as Mg, Na, Mn, Ca, K and Si will not be removed. The precipitate, which consists of mostly iron oxide, is filtered and washed prior to disposal. Wash water requirements are about 1.2 t/t dry residue with a wash efficiency of 90% for this specific feed. The use of coagulants is expected to improve this washing operation.

For the proposed neutralization process to be economically successful, a low-contaminant am alkaline material is required. Common alkalis such as caustic soda will cause build-up of sodium ions in solution that will have to be bled from the process, or treated in capital and energy intensive chloroalkali plants. The use of MgO resolves this issue, due to the recycling option. Following ZnO precipitation, the concentrated $MgCl_2$ solution is subjected to pyrohydrolysis, where MgO and HCl are regenerated and re-utilized. As an alternative to MgO, the use of zinc oxide containing material sources from pyrometallurgical processing or fuming operations is an option. Metallurgical dusts may contain a portion of zinc ferrite ($ZnO \cdot Fe_2O_3$) which can be assumed to have no neutralizing ability in the pH range of interest. Literature suggests that at a pH of 3, in a hot zinc chloride brine, less than 0.1% of the iron from the ferrite will solubilize. This finding supports the selective dissolution of zinc.

The efficiency of MgO in causing the precipitation of Fe, Cu, Pb, Al was calculated to be 98, 100 and 86% at pH 2.5, 3.0 and 3.5, respectively. The pH range over which this step of the process may be conducted is from 2.5 to 5.0, with 3.5 to 4.0 being the preferred final pH of the solution. The precipitation step is carried out at from 50 to 150° C., with 95° C. being the preferred solution temperature. This step should be carried out over 30 minutes to 4 hours, with a preferred retention time of 2 hours. The consumption of $Ca(OH)_2$ and MgO was respectively 0.02 and 0.14 t per t of Zn treated. The filtrate from this step is sent to cementation.

Cementation

Copper, silver, and lead are recovered from the leach solution by cementation with zinc dust. Zinc dust is added in an amount equivalent to 100 to 200% of the stoichiometric concentrations of metals present in the leach solution. In addition to the above-mentioned metals, cadmium and cobalt may also be removed from the leach solution.

The pregnant leach solution, heated to 90° C. and now purified of iron and other contaminants, is contacted with zinc dust to remove lead, silver and copper into a saleable silver-bearing precipitate. The amount of zinc dust needed is approximately 100–200% of the stoichiometric amount required to cement Cu+Pb+Ag, while minimizing contamination of the cement cake with cadmium. Adjusting the zinc dosage will lead to a cementation cake containing from 1 to 90% Ag. Any lead remaining in solution after cementation will be present in the ZnO precipitate, and can be handled at a zinc refinery. It should be noted that some of the impurities (e.g., Cd, Co) are easier to remove using a chloride system according to the prior art. A relatively pure zinc chloride solution is obtained after cementation, and can be further purified if required.

The cementation step described above may be carried out at a pH range of from 2.8 to 4.0, although a pH of 3.0 is preferred. The temperature of the solution may range from 50 to 100° C., and 90° C. is the preferred temperature for cementation. Although it is stated above that it is preferred that from 100 to 300% of zinc powder be added according to the stoichiometric amounts of Cd, Cu, Pb, Ag, and Co present in solution, it is possible to utilize from 50 to 1000% zinc dust based on the amount of these metals present. The silver content in the copper cementation cake increases from 0.01 to 40%. The retention time for performing this step of the process according to the present invention should be at least 20 minutes.

It should also be noted that although the cementation step described above as a single stage, it is possible to use two or more stages in the cementation step. When a multi-step cementation is used, it is possible to obtain cementation cakes having different compositions. The first typically contains silver and copper, the second contains cadmium, cobalt and lead, and the third cake will contain cadmium, cobalt and other impurities. Such a multi-step cementation allows better separation of the desired metals and facilitates further processing.

Zinc Oxide Precipitation

The process according to the present invention also requires precipitating zinc oxide from the zinc chloride solution, which has a concentration of from 0.5 to 3.0 M and is obtained after the initial steps of the process, using a magnesium oxide slurry. The addition of MgO is sub-stoichiometric, at an amount of from 3 to 100% of the concentration of zinc present in the leach solution, so as not to cause all of the zinc present in the leach solution to precipitate in one tank. The pH is not controlled during this step, and the temperature of the solution may range from 50 to 100° C. Approximately 80% of the zinc present in the leach solution is precipitated as zinc hydroxychloride upon addition of the magnesium oxide slurry. The magnesium used for this precipitation step should be very clean as all impurities that it may contain will likely remain in the end product. Preferably, the product from the pyrohydrolyzer should be used. The precipitated product is then washed and destabilized at 95° C. by adjusting the pH with lime (calcium oxide) to remove chloride ions.

A solid/liquid separation is then performed, and the leach solution having a lowered zinc concentration undergoes a second precipitating step using magnesium oxide. This second step is intended to result in obtaining a leach solution having less than 1 g/l of zinc. This step is conducted at a pH of from 4.0 to 9.0, with a preferred pH in the range of 6.5 to 7.0, at a temperature of from 50 to 150° C., and preferably at 75° C. After another solid/liquid separation, this product, a contaminated zinc hydroxychloride, is recycled to the primary zinc oxide precipitation described above in order to maximize MgO utilization and to recover the zinc. It is also possible to utilize sodium hydroxide or calcium oxide to obtain a low-chloride content zinc oxide in one precipitation step.

The zinc oxide is later dried and shipped to a refinery for redissolution, purification using zinc dust, and zinc sulfate electrowinning. The zinc oxide precipitate contains approximately 74% zinc, and preferably has a chloride content less than 0.1%, and a magnesium content less than 0.5% present as impurities. This level of purity is established in order to facilitate the process of electrolytic zinc refining.

The use of MgO as the neutralizing reagent results, theoretically, in the following reactions:

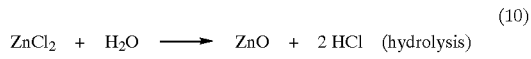
(10)

(11)

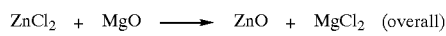
(12)

This series of reactions represents a conventional neutralization process with the objective of generating a ZnO product of high purity.

A metastable zinc hydroxychloride compound is also known to form during neutralisation in highly concentrated $ZnCl_2$ and $MgCl_2$ solutions:

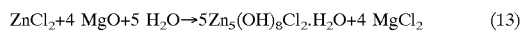
(13)

Stability diagrams of zinc solutions containing chloride ions have been developed by Dr. Ton van Sandwijk (Delft University of Technology) using thermodynamic principles, with an attempt to represent the kinetics involved by the addition of the metastable zone of the zinc hydroxychloride to the basic zinc oxide precipitation diagram.

Figure 2:
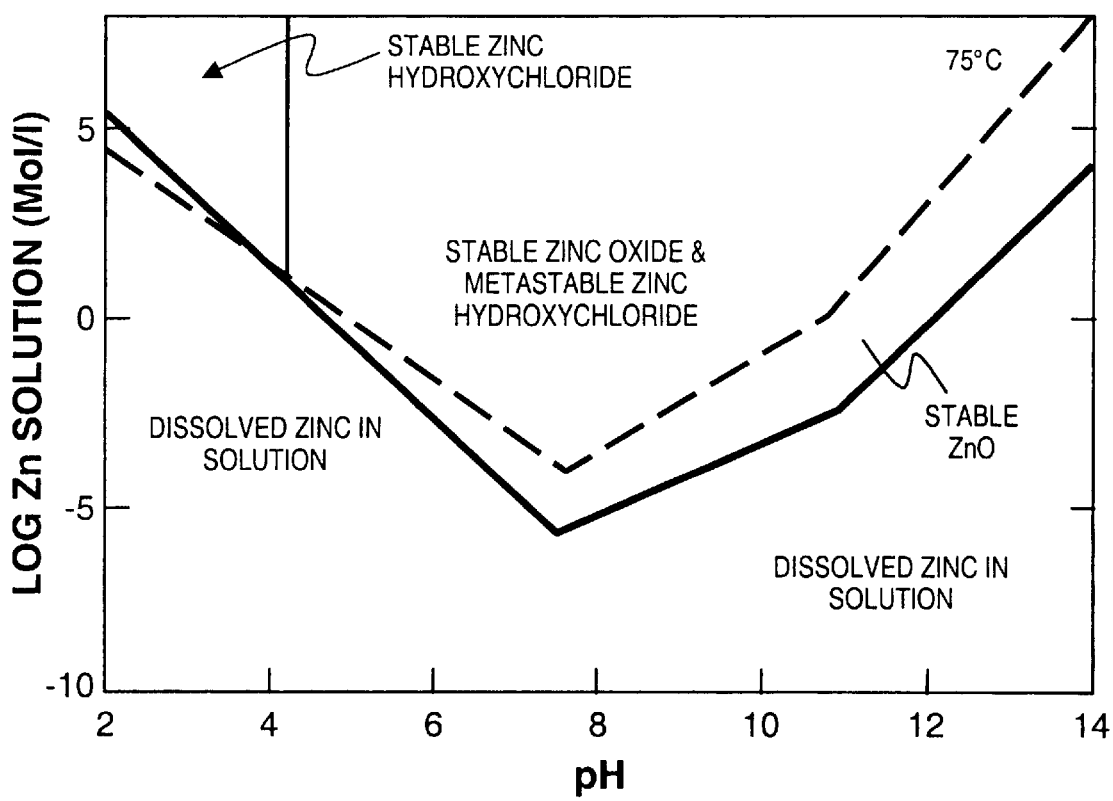
FIG. 2 is a graph showing the thermodynamically predicted optimum conditions for production of a high quality zinc precipitate according to the present invention.

FIG. 2 shows that the region of high quality precipitate, the stable ZnO region, exists between two lines. At a temperature of 75° C., the region is largest in the pH range of 8 to 11, which appears to be outside of the useful window offered using MgO as a neutralizing agent. Neutralization with MgO can reach a maximum pH of ~8.0, which decreases as temperature increases to an extent that only pH 6.5 can be reached at 95° C. MgO should be used at the maximum operable temperature. Due to the pH limitations of using MgO as a neutralizing agent, the "pH static" neutralization approach was selected, where the neutralizing agent and the solution to be treated are added simultaneously so that pH is controlled at a fixed level. However, if NaOH or $Ca(OH)_2$ were used as a neutralizing agent, a direct neutralization could be effected. In addition, with those reagents the neutralization can be carried out at a high pH where zinc oxide is more stable. A dilute neutralizing slurry of MgO gave a good quality product, but the need to evaporate large amounts of water before pyrohydrolysis of the $MgCl_2$ solution to generate HCl and MgO for recycling requires that higher concentrations of MgO slurry be used. Dry MgO cannot be used as it causes the formation of Sorel cement, a compound of magnesium chloride and oxide. Therefore, a well-slaked high-solid slurry of MgO (i.e., 30 wt. %) was used.

The ZnO precipitate produced in this fashion contains high concentrations of Mg and Cl.

The zinc hydroxychloride precipitate has to be rid of Mg and Cl by repulping the zinc precipitate at higher pH values. In order to raise the pH of the solution, $Ca(OH)_2$ or NaOH may be added, so that the pH is in the range of from 8 to 12, with 9.0 being the preferred pH. Raising the pH causes the hydroxychlorides present in the solution to be destabilized, and also results in the removal of chloride. Preferably this chloride removal step is carried out at a temperature of from 50 to 150° C., and preferably at 95° C. Repulping of the zinc hydroxychloride precipitate with $Ca(OH)_2$ at pH 9 and at 75° C. destabilizes the hydroxychlorides sufficiently, so that the result is a high purity ZnO product.

Figure 3:
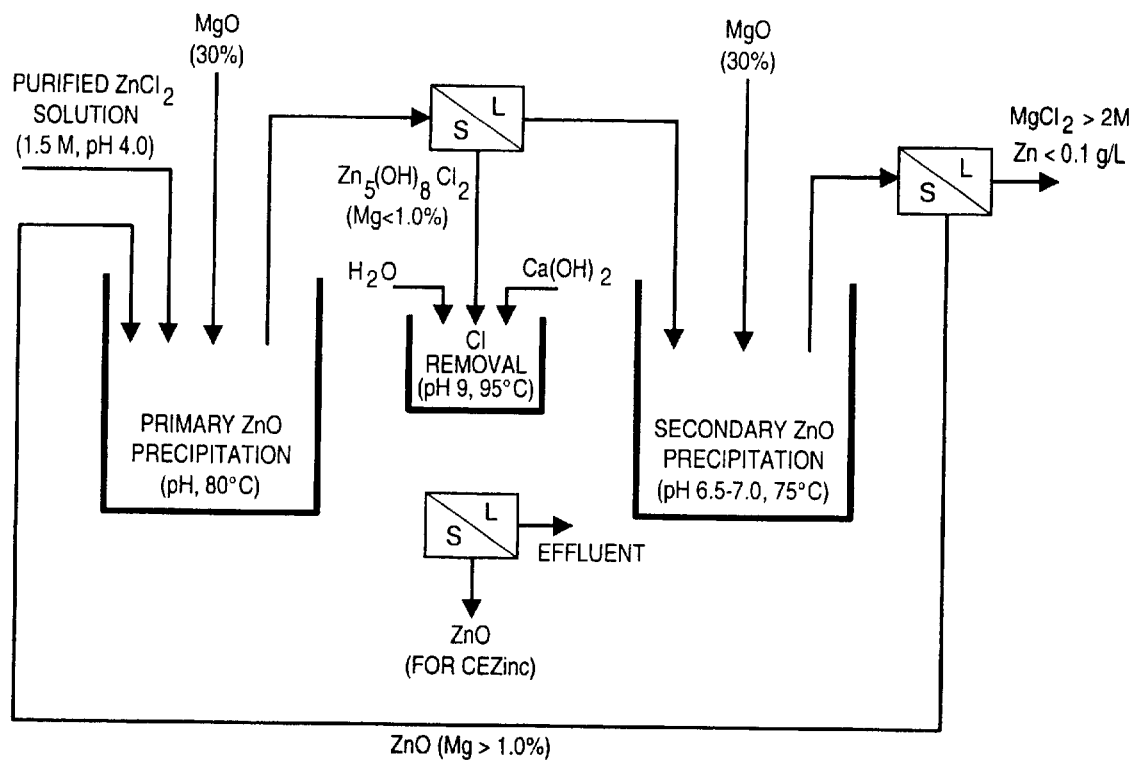
FIG. 3 illustrates the proposed unit operation for precipitation and de-contamination of zinc oxide.

These findings lead to a unit operation as presented in FIG. 3 for the precipitation and de-contamination of the ZnO product. According to this approach ZnO precipitation takes place at low pH (i.e., 5.0–5.5) with the addition of 50% of the stoichiometrically required amount of MgO, with the objective of minimising Mg content in the precipitate. Then, the zinc precipitate is filtered and the cake is subjected to an alkaline repulping with the addition of lime (CaO) to remove the Cl contaminant, while the filtrate is further treated with MgO (30 wt %) to precipitate any residual zinc. The second zinc precipitate, which has a high magnesium content, is recycled to the primary zinc precipitation. This approach ensures maximum utilization of MgO and maximum recycling of a low zinc-bearing $MgCl_2$ solution in the pyrohydrolysis step. This processing approach results in the production of a high quality ZnO product that is acceptable to zinc refineries.

The ZnO product is generated through a primary precipitation by MgO slurry where 80% of the solution's zinc content is precipitated as zinc hydroxychloride, followed by washing and destabilizing this product at 95° C. by pH adjustment with lime (CaO) to remove Cl. A solid-liquid separation is performed, and the lower zinc content solution goes to a secondary step of precipitation where zinc is precipitated as a magnesium contaminated zinc hydroxychloride. After another solid-liquid separation, this product is recycled to the primary ZnO precipitation, while the clarified, concentrated $MgCl_2$ solution (~200 g/l) is directed into the pyrohydrolysis unit for regeneration and recycling of HCl and MgO. This approach generates an iron free ZnO product of 74% Zn, that is low in Cl (i.e., 0.09%) and Mg (i.e., 0.5%).

Zinc Sulfate Electrolysis

The ZnO product obtained according to the present invention could be introduced in an entirely independent circuit in a zinc refinery, or it could be introduced in an existing plant circuit with provisions for increasing plant capacity through full operation of a cellhouse. Impurity tolerance (e.g., Cl content) in ZnO is higher if the second approach is implemented. ZnO dissolution in spent electrolyte is rapid (less than 10 minutes is required) and can be carried out easily at room temperature. An increase in the zinc content present in solution from 57 g/l to 100 g/l resulted in a temperature increase. Higher zinc concentrations can be desirable if a cementation step has to be carried out in sulfate media. A Mg content of 1.0% in the ZnO feed has been determined to be acceptable, although lower concentrations are more desirable. The reference limit for Cl— in the electrolyte should not be exceeded, otherwise, chlorine could evolve at the anode, but the extent of this reaction is unknown.

Figure 4:
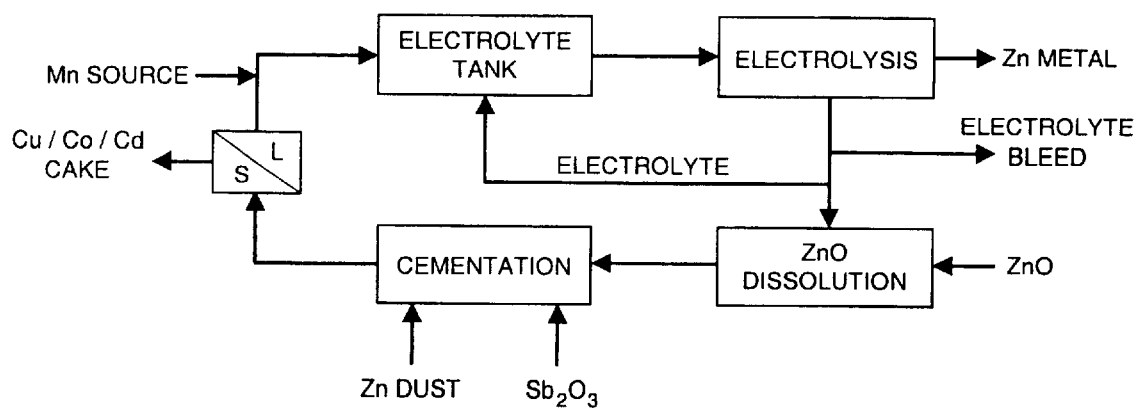
FIG. 4 shows an example of how a zinc refinery might process the zinc oxide feed material produced according to the present invention.

Electrowinning with aluminium cathodes and lead-silver anodes were carried out on the reconstituted electrolyte at 400–600 A/m$^2$ and 38° C. FIG. 4 shows how a zinc refinery may process this feed material. So that a conventional cellhouse may operate with lead-silver anodes, a Mn additive should be introduced into the electrolyte. In order to take advantage of the lack of manganese in the electrolyte, DSA (dimensionally stabilized anodes) or other advanced anodes may be used.

Spray Drying

The remaining magnesium chloride leach solution is spray roasted in a pyrohydrolysis unit in order to regenerate hydrochloric acid and magnesium oxide. Magnesium chloride is present in the solution at approximately 200 g/l. This recycling step improves the cost-efficiency of the process according to the present invention, and is optional.

Following ZnO precipitation, the concentrated MgCl$_2$ solution may be subjected to pyrohydrolysis, where MgO and HCl are regenerated for re-utilization in the process according to the present invention.

Under ideal operating conditions, the hydrochloric acid and oxygen leaching system described above is highly efficient, highly selective, and redox potential-controlled. The typical range for the amount of zinc extracted from a sulfide concentrate is from 90 to 94%. Iron extraction according to the present process is limited to 0.15 ton Fe/ton Zn. Further, during the process the sulfur present as sulfides is transformed mainly into elemental sulfur.

The above-described chloride process is especially beneficial for use in the processing of secondary materials, the processing of zinc oxide ores, and as an add-on technology for processing flotation tailings in complex sulfide ores, although it is not limited to these uses. Furthermore, numerous potential process improvements and modifications may be conceived that will improve performance and improve cost-efficiency. These improvements are considered to be within the scope of the present invention.

Figure 5A:
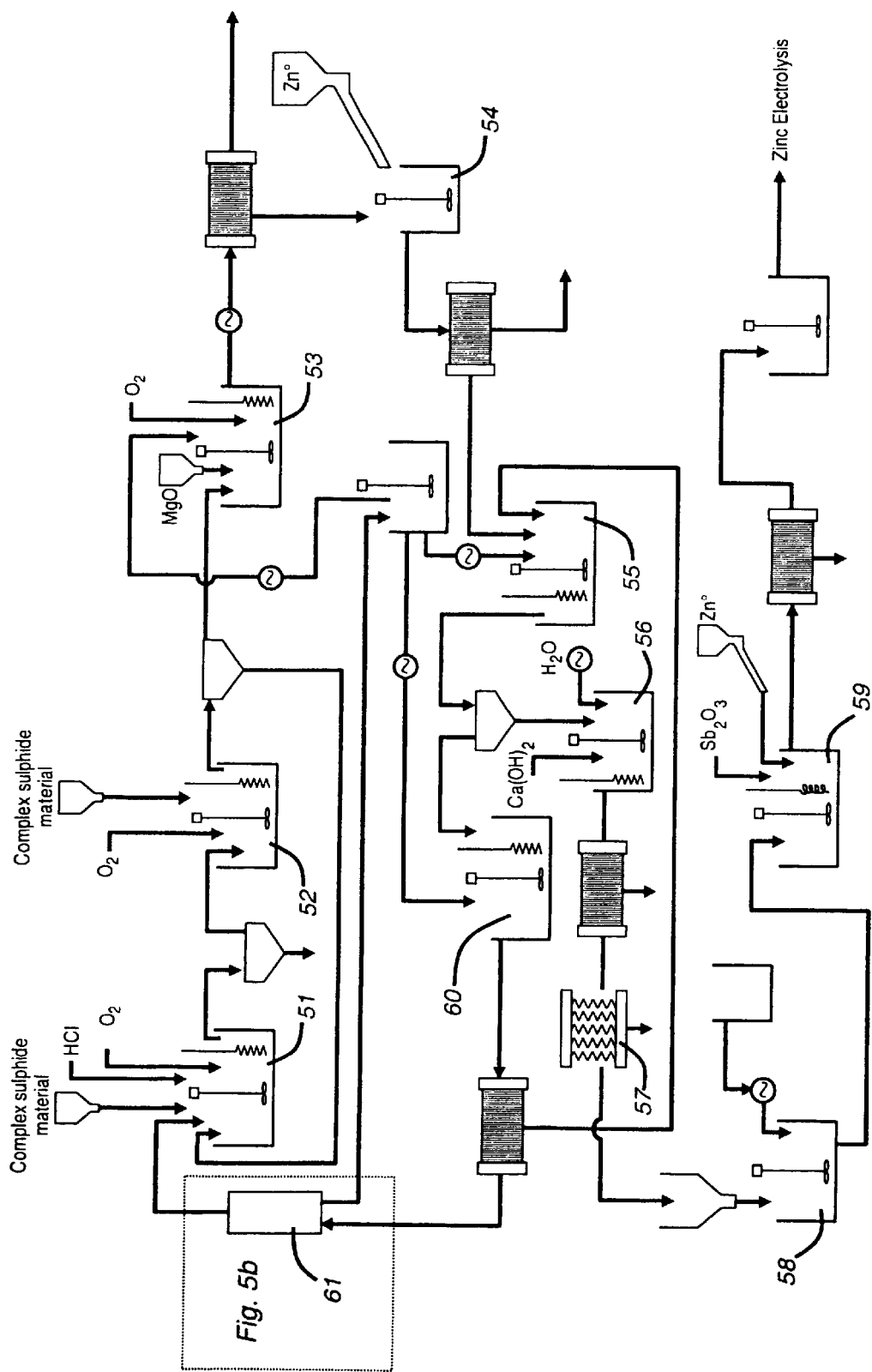
FIG. 5a is a block diagram illustrating the preferred apparatus for producing zinc oxide from a complex sulfide material using chloride processing.
Figure 5B:
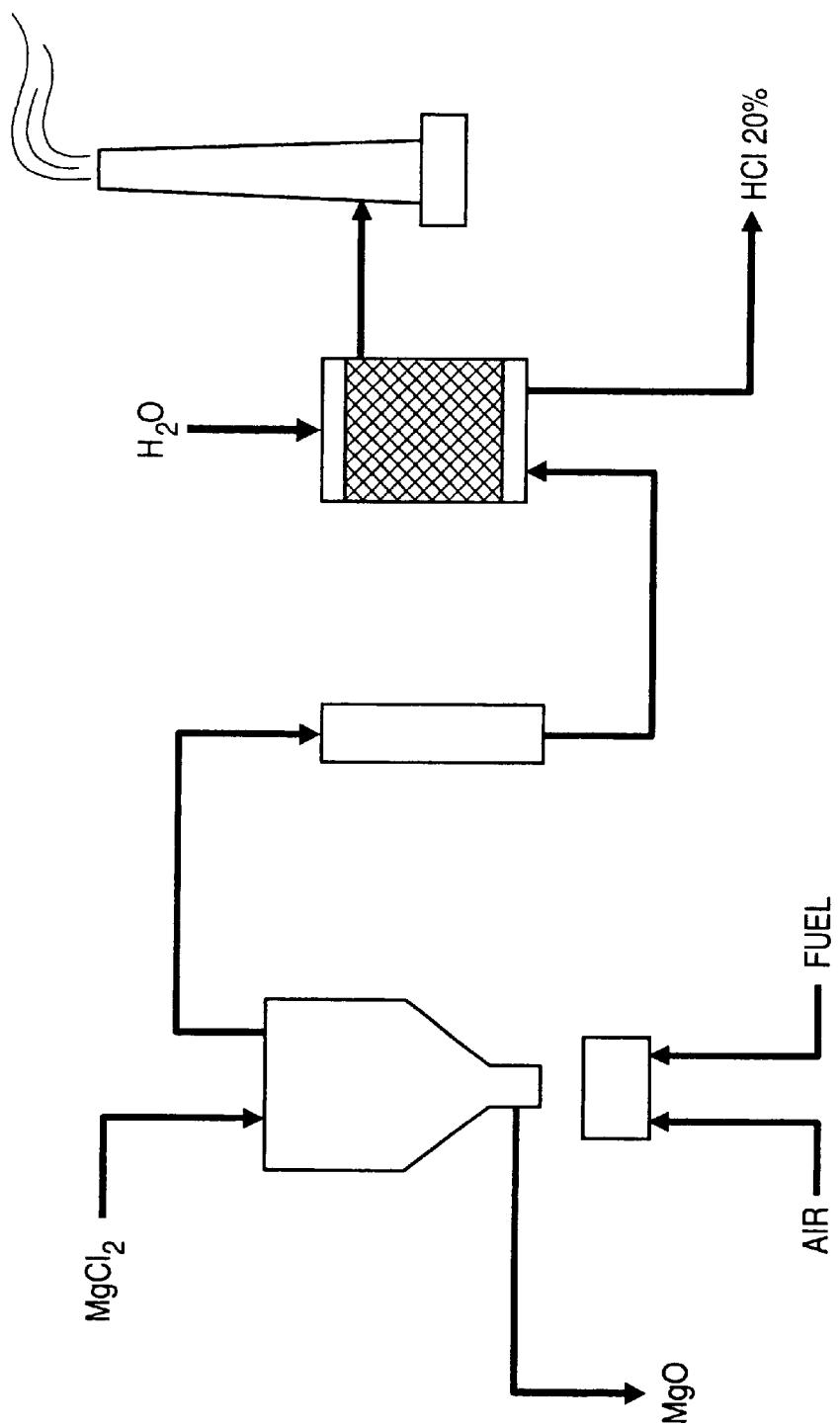
FIG. 5b is a block diagram providing further detail of the preferred apparatus for performing pyrohydrolysis of MgO.

An apparatus for carrying out the process of the present invention will now be described with reference to FIG. 5a. A complex sulfide material is added to leaching unit 51, where leaching occurs using HCl and O$_2$. The solution is further treated by a acid neutralization unit 52 by addition of more feed material and oxygen. The leach solution from the leaching unit, which contains aqueous zinc compounds, is then sent to a first precipitating unit 53, where iron is precipitated from the leach solution using magnesium oxide, or another precipitating agent. The leach solution may then be sent to a cementation unit 54, where metals such as copper, silver, lead, cadmium and cobalt are cemented using zinc dust. The solution is then treated in a second precipitating unit 55, where zinc hydroxychloride is precipitated from the leach solution using magnesium oxide. In this step, approximately 80% of the zinc content of the zinc chloride solution is depleted (the zinc concentration is reduced from about 90 g/L to about 12 g/L), and a zinc hydroxychloride precipitate having a low magnesium content is produced. This step is preferably carried out at 80° C. A chlorine removal unit 56 is required to convert hydroxychloride into a high purity zinc oxide by pH adjustement with addition of lime. The wet zinc oxide is then dried in unit 57, The zinc oxide may optionally be sent to a zinc oxide purifying unit 58 for redissolution in electrolyte. The zinc oxide may also be further purified using zinc dust in unit 59, and Sb$_2$O$_3$ may optionally be added as an activator to improve cobalt cementation. The zinc oxide precipitate may also be sent to a retention tank, and may then be subjected to zinc sulfate electrowinning.

The zinc chloride solution (containing approximately 12 g Zn/L) remaining after treatment in the second precipitation unit 55 is sent to the third precipitation unit 60. The zinc chloride solution is then neutralized with MgO again in the third precipitation unit. This step produces a zinc hydroxychloride having a high magnesium content, and removes nearly all of the zinc remaining in solution (preferably less than 0.1 g Zn/L remains after this step). This is preferably carried out at 75° C., and at a pH of from 6.5 to 7.0. The magnesium-contaminated zinc hydroxychloride produced in 60 is preferably recycled to the second precipitating unit 55 for further treatment. The residual magnesium chloride solution (preferably having less than about 0.1 g Zn/L) remaining after treatment in the third precipitating unit 60 is then sent to a spray roasting unit 61, where the magnesium chloride solution is spray roasted to regenerate hydrochloric acid and magnesium oxide.

Although this apparatus has been described with reference to several separate units, it is within the scope of the present invention to add additional units to perform additional functions. In addition, it is considered a minor modification of the present invention to conduct multiple steps of the process in the same unit, such as using one precipitation unit for the iron precipitation, zinc dust cementation, and zinc oxide precipitation steps.

EXAMPLES

The present invention will now be described with reference to the following examples. It should be noted that although a complete process for producing zinc oxide from complex sulfide concentrates is described in the present application, the following examples will focus on the precipitation of zinc oxide.

Example 1

Three tests were conducted at pH 2.5, 3.0 and 3.5, in order to evaluate the efficiency of MgO addition at different pH levels and the resulting quality of the purified solution produced. Iron precipitation takes place at 90–95° C., ORP 350–400 mV, for a duration of 60 min. The iron precipitate formed is an easily-filtered akaganeite (i.e., β-FeO(OH)). The results show that 2.5 is the optimum pH for efficient iron precipitation. (See Table 1.) In addition, Zn losses were negligible, reaching only 1.3% at pH 2.5.

TABLE 1

Metal Concentrations in the Filtrate (mg/l) after Iron Precipitation

| pH  | Fe    | Al   | As   | Cu   | Co | $SO_4$ | $Zn^{(1)}$ |
|-----|-------|------|------|------|----|--------|------------|
| 2.5 | 0.69  | <4.0 | <8.0 | 3000 | 29 | 2200   | 3.2%       |
| 3.0 | 1.1   | 5.7  | <8.0 | 3200 | 21 | 1300   | 1.1%       |
| 3.5 | <0.40 | <4.0 | <8.0 | 240  | 24 | 2200   | 7.7%       |

$^{(1)}$Zn concentration in the precipitation residue

Example 2

Cementation

Cementation was conducted at pH 2.7, with agitation at a speed of 650 rpm, and a constant temperature of 90° C. The stoichiometric quantity of Zn added was based on the Cu, Pb, Cd, Ag and Co concentrations measured in the starting solution. The results shown in Table 2 indicate that Ag, Cu and half of the Pb were removed with the Zn in an amount equivalent to 100% stoichiometry. At 200%, Pb, Cd and some Co were removed, whereas at 300% most of the Co was also removed. These findings indicate that adjusting the zinc dosage leads to a cementation cake containing from 5 to 90% Ag. The extra lead remaining in solution is removed later in the ZnO precipitate, and can be handled at a zinc refinery. Results are shown in Table 2.

TABLE 2

Metal Concentrations in the Filtrate (mg/l) after Cementation

| Stoich. | Ag   | Cu    | Pb   | Cd   | Ni    | Tl   | Co  |
|---------|------|-------|------|------|-------|------|-----|
| HEAD    | 40   | 1800  | 1400 | 130  | 8.4   | 10   | 14  |
| 100%    | <1.0 | 0.46  | 745  | 107  | 6.1   | 3.5  | 13  |
| 200%    | <1.0 | 0.24  | <1.0 | 0.26 | <0.20 | <1.0 | 4.2 |
| 300%    | <1.0 | <0.10 | <1.0 | 0.10 | <0.20 | <1.0 | 1.0 |

Example 3

Washing ZnO

The preferred way to reduce Cl and Mg in the ZnO precipitate is to wash any trace of $MgCl_2$ solution from the solid. Table 3 shows the impact of washing 3 kg of zinc hydroxychloride on residual magnesium and chloride levels in the zinc oxide. Chlorides can be reduced from 15% to 2% simply by washing the solid thoroughly. However, although washing works to a certain extent, given the asymptotic nature of the removal of impurities it is not sufficient by itself to reach the target level for Cl— of 0.1%.

TABLE 3

Washing of Zinc Precipitate

| | | Wash solution | | | Solids | |
|---|---|---|---|---|---|---|
| Wash # | Volume (l) | [Mg] (g/l) | [Zn] (g/l) | [Cl] (g/l) | [Mg] (%) | [Cl] (%) |
| 0 | 0.0 | 32.0 | 7.46 | 102 | 4.79 | 15.3 |
| 1 | 3.1 | 24.4 | 2.58 | 73.3 | 3.66 | 11.0 |
| 2 | 3.0 | 13.8 | 0.66 | 40.7 | 2.06 | 6.10 |
| 3 | 3.0 | 8.37 | 0.27 | 27.1 | 1.25 | 4.06 |
| 4 | 4.6 | 2.81 | 0.006 | 17.0 | 0.40 | 2.50 |
| Total | 13.7 | | | | | |

Example 4

Tests were carried out using a synthetic solution of 100 g/l of Zn (in the form of $ZnCl_2$) and a neutralization suspension of 3% solids MgO. The precipitates produced in this battery of tests did not meet the magnesium and chlorine target levels. However, the end product after static pH precipitation is generally less contaminated with magnesium and chlorine than the one obtained through direct precipitation. Table 4 below shows the results for static pH precipitation using a well-slaked suspension of light laboratory grade MgO as the neutralizing agent. The test performed using static pH precipitation with a 3% MgO slurry at 95° C. and a pH of 6.0 resulted in the least contaminated ZnO precipitate with 0.49% Cl and 0.41% Mg. Static pH tests were also conducted using NaOH. They resulted in a product that was very low in Cl (0.01%) and Na (0.02% at a pH of 10.0, the ZnO stability zone is wider, making it easier to obtain this product.

TABLE 4

Results of Static pH Precipitation

| Conditions | | Final Solution | Zn Precipitate | | |
|---|---|---|---|---|---|
| T (° C.) | pH | Zn (mg/l) | Cl % | Mg % | Zn % |
| 50 | 8.7 | <0.2 | 1.45 | 8.02 | 58.6 |
| 75 | 6.0 | <0.1 | 9.62 | 7.41 | 48.8 |
| 75 | 6.5 | <0.1 | 1.77 | 6.14 | 66.0 |
| 75 | 7.5 | <0.1 | 7.11 | 19.00 | 34.2 |
| 95 | 6.0 | <0.1 | 8.12 | 11.60 | 45.7 |
| 95 | 6.5 | 0.2 | 0.98 | 2.53 | 67.2 |
| 95 | 7.0 | <0.1 | 10.60 | 17.50 | 34.5 |

Example 5

The process shown in FIG. 3 may be used to produce zinc oxide. Results are shown in table 5.

TABLE 5

Chemical Composition of Solids from the Processing of Complex Sulfide Concentrate

| As (%) | Cd (%) | Co (%) | Cl (%) | Cu (%) | Fe (%) | Mg (%) | Pd (%) | Zn (%) | Ag (µg/g) |
|---|---|---|---|---|---|---|---|---|---|
| *Zinc Concentrate* | | | | | | | | | |
| 0.35 | - | - | - | 0.21 | 32.8 | - | 2.14 | 17.0 | 123 |
| *HCl Leach - residue* | | | | | | | | | |
| 0.18 | - | - | - | 0.029 | 37.5 | - | 2.48 | 1.34 | 49.1 |
| 0.18 | - | - | - | 0.027 | 37.6 | - | 2.21 | 1.60 | - |
| *Acid Reduction - residue* | | | | | | | | | |
| 1.02 | - | - | - | 0.22 | 36.2 | - | 0.65 | 12.0 | 65.6 |
| 0.91 | - | - | - | 0.18 | 36.1 | - | 0.54 | 12.2 | 57.1 |
| *Iron Precipitation* | | | | | | | | | |
| 0.19 | - | - | - | 4.02 | 46.4 | - | 5.06 | 7.60 | 80.6 |
| 0.41 | - | - | - | 4.54 | 41.5 | - | 5.24 | 13.0 | 120 |
| *Cementation* | | | | | | | | | |
| <0.005 | 8.64 | 0.56 | | 11.2 | 0.008 | - | 57.0 | 12.9 | 1.62% |
| 0.017 | 10.4 | 0.93 | - | 4.53 | 0.011 | - | 53.0 | 15.4 | 3.39% |
| *ZnO Primary Precipitation* | | | | | | | | | |
| <0.002 | 0.0001 | 0.020 | 12.7 | 0.0002 | 0.028 | 0.45 | | <0.001 | 61.7 | - |
| *ZnO Chloride Removal - product to CEZinc* | | | | | | | | | |
| <0.002 | <0.0001 | 0.012 | 0.093 | 0.0004 | 0.033 | 0.52 | | <0.001 | 74.0 | - |

Example 6

Hydroxychlorides are destabilized through the action of dilute chloride solution at high pH and temperature to convert the zinc hydroxychlorides to zinc oxide. Destabilization is accomplished by re-pulping the Cl-contaminated precipitate with de-ionized water to produce a 10% solids suspension. The suspension is then heated, and the pH is raised. The tests were performed with a freshly precipitated product. The moist hydroxychloride was re-pulped in distilled water at a given temperature between 20 and 95° C. The pH was adjusted using lime, sodium carbonate or NaOH. The solid remained in contact with the solution for one or two hours. The results are presented in Table 6. The best results were obtained when destabilization was carried out at 95° C. at a pH of 9.0. Destabilization at a lower temperature had little effect on the the product. Lime, sodium carbonate and NaOH were equally effective in hydroxychlorides.

TABLE 6

Destabilization of Zinc Hydroxychloride

| T (° C.) | pH | Reagent | Conc. (M) | Zn (mg/L) | Cl (%) | Mg (%) | Zn (%) |
|---|---|---|---|---|---|---|---|
| 22 | 9.3 | | | 2.2 | 1.64 | 2.62 | 72.9 |
| 50 | 9.3 | | | 1.01 | 1.57 | 2.65 | 72.1 |

TABLE 6-continued

Destabilization of Zinc Hydroxychloride

| T (° C.) | pH | Reagent | Conc. (M) | Zn (mg/L) | Cl (%) | Mg (%) | Zn (%) |
|---|---|---|---|---|---|---|---|
| 95 | 7.66 | | | 1.24 | 0.53 | 2.38 | 73.9 |
| 95 | 9 | | | 2.43 | 0.008 | 2.73 | 74.1 |
| 95 | 9 | | | 6.15 | 0.41 | 2.19 | 73.8 |
| 95 | 10 | NaOH | 0.2 M | 74.7 | 0.15 | 2.64 | 69.7 |
| 95 | 10 | NaOH | 0.2 M | 0.94 | 0.18 | 2.45 | 74.5 |
| 95 | 11 | NaOH | 0.2 M | 598 | 0.15 | 2.66 | 68.4 |
| 95 | 11 | NaOH | 0.2 M | 27.2 | 0.19 | 2.43 | 74.6 | initial concentrations: 2.95% Cl, 2.99% Mg, 70.9% Zn

Example 7

Several tests were carried out to dissolve zinc oxide in a zinc electrolyte (40–50 g/L Zn, 180–210 g/L H2SO4). Dissolution is rapid (less than 10 minutes is required) and can be earned out easily at room temperature. An increase in the zinc content in solution from 57 g/l to 100 g/l resulted in an increase in the solution temperature of about 15° C. It might be preferable to further increase the zinc content of the solution (to 130 g/l), in order to further consume acid present in the solution and enable it to be fed directly to a cementation circuit (see FIG. 4). Results are shown in Table 7.

TABLE 7

Results for Dissolution of Zinc Oxide in Zinc Electrolyte

| Type of solution | [Mg] (g/l) | [Mn] (g/l) | [Zn] ini (g/l) | [Zn]f (g/l) | [Zn] added (g/l) | Time to dissolve (sec) | Temperature increase (° C.) |
|---|---|---|---|---|---|---|---|
| synthetic | | | 57.2 | 99 | 41.5 | 899 | 14.1 |
| synthetic | | | 61.5 | 111 | 49.5 | 490 | 15.1 |
| synthetic | 12.0 | 3.93 | 58.9 | 105 | 46.3 | 793 | 16.1 |
| Zn electrolyte | | | 46.4 | 56 | 9.10 | 393 | 2.5 |
| Zn electrolyte | | | 46.6 | 55 | 8.10 | 466 | 3.1 |
| Zn electrolyte | | | 46.7 | 93 | 46.2 | 496 | 15 |

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A process for recovering (i) zinc oxide, (ii) iron, and (iii) at least one of copper, silver, cadmium, cobalt and lead from a material that includes zinc, iron, and at least one of copper, silver, cadmium, cobalt and lead, comprising the steps of:
   leaching the material with hydrochloric acid and oxygen to produce a leach solution;
   precipitating iron from the leach solution with magnesium oxide;
   recovering at least one of copper, silver, cadmium, cobalt and lead from the leach solution by cementation with zinc dust; and
   precipitating zinc oxide from the leach solution with magnesium oxide.

2. The process of claim 1, wherein the lead is precipitated from the leach solution as lead chloride, and is crystallized for recovery at a lead refinery.

3. The process of claim 1, wherein the cementation with zinc dust is carried out in two or more stages.

4. A process for producing zinc oxide from a material which contains (i) zinc, (ii) iron, and (iii) at least one of copper, silver, cadmium, cobalt and lead, the process comprising the steps of:
   leaching the material with hydrochloric acid and oxygen to produce a leach solution;
   precipitating iron from the leach solution with magnesium oxide;
   recovering at least one of copper, silver, cadmium, cobalt and lead from the leach solution by cementation with zinc dust;
   precipitating zinc oxide from the leach solution with magnesium oxide; and
   spray roasting a magnesium chloride solution remaining after precipitating zinc oxide to regenerate hydrochloric acid and magnesium oxide.

5. The process of claim 4, further comprising the step of drying the zinc oxide precipitate.

6. The process of claim 4, further comprising the step of re-dissolving, purifying with zinc dust, and zinc sulfate electrowinning of the zinc oxide precipitate.

7. The process of claim 4, further comprising the step of removing additional trace elements from the solution during cementation.

8. The process of claim 4, wherein the leach solution has a temperature in the range of approximately 50 to 150° C.

9. The process of claim 4, wherein the leach solution has a pH of 1 or lower.

10. The process of claim 4, wherein the zinc oxide precipitate has a chloride content of less than 0.1% by weight, and a magnesium content of less than 0.5% by weight.

11. The process of claim 4, wherein 90% by weight or more of zinc is extracted from the zinc-bearing material.

12. The process of claim 4, wherein the zinc-bearing material is a complex sulfide material.

13. The process of claim 12, wherein sulfide sulfur present in the complex sulfide material is transformed into elemental sulfur.

14. The process of claim 4, wherein the zinc-bearing material comprises a secondary material selected from the group consisting of EAF dust, BOF dust, and ferrites.

15. The process of claim 4, wherein the cementation with zinc dust is carried out in two or more stages.

16. The process of claim 4, wherein the leaching step is conducted as a single step.

17. The process of claim 4, wherein the leaching step is conducted as a continuous process having multiple HCl addition points.

18. The process of claim 4, further comprising an acid neutralization step to remove excess HCl from the leach solution.

19. The process of claim 4, wherein the leaching step includes the step of oxidizing iron.

20. The process of claim 4, wherein, in the leaching step, the material and the oxygen are added to maintain a redox potential between 250 and 600 mV.

21. The process of claim 4, wherein, in the precipitating zinc oxide step, the zinc is precipitated from the zinc chloride solution as zinc hydroxychloride.

22. The process of claim 21, wherein the precipitation is effected by addition of MgO.

23. The process of claim 21, wherein the precipitation is effected at a temperature between 50° C. and 100° C.

24. The process of claim 21, wherein the precipitation is effected at a pH between 4.0 and 9.0.

25. The process of claim 21, wherein zinc is partially removed from zinc chloride solution.

26. The process of claim 21, wherein a low magnesium zinc hydroxychloride is produced in the precipitating zinc oxide step.

27. The process of claim 21, wherein the zinc hydroxychloride is destabilized.

28. The process of claim 27, wherein the destabilization is effected on solids following a solid-liquid separation.

29. The process of claim 27, wherein the destabilization is effected at a temperature between 20 and 95° C.

30. The process of claim 27, wherein the destabilization is effected at a pH between 7.66 and 12.

31. The Process of claim 27, wherein the destabilization is carried out by addition of one of lime, hydrated lime, and sodium hydroxide.

32. The process of claim 21, wherein the partial liquor, after a solid-liquid separation, is subjected to a secondary zinc precipitation step.

33. The process of claim 32, wherein the secondary zinc precipitation step is carried out at a temperature of from 50° C. to 150° C.

34. The process of claim 32, wherein the secondary zinc precipitation step is carried out at a pH of from 4.0 to 9.0.

35. The process of claim 32, wherein the recovered solids contain a portion of magnesium.

36. The process of claim 32, wherein the recovered solids are sent to the precipitating zinc oxide step.

37. The process of claim 4, wherein the material contains silver, and the amount of zinc dust added during the cementation step is adjusted to increase the amount of silver recovered from said material.

* * * * *